US012658608B2

(12) United States Patent
Khu et al.

(10) Patent No.: US 12,658,608 B2
(45) Date of Patent: Jun. 16, 2026

(54) METHOD FOR CONNECTING AN ELECTRICAL CABLE TO A CONTACT PIECE

(71) Applicant: Komax Holding AG, Dierikon (CH)

(72) Inventors: Peter Khu, Vienna (AT); Andreas Zelzer, Schönberg (DE)

(73) Assignee: KOMAX HOLDING, AG, Dierikon (CH)

( * ) Notice: Subject to any disclaimer, the term of this patent is extended or adjusted under 35 U.S.C. 154(b) by 636 days.

(21) Appl. No.: 18/157,284

(22) Filed: Jan. 20, 2023

(65) Prior Publication Data

US 2023/0231327 A1 Jul. 20, 2023

(30) Foreign Application Priority Data

Jan. 20, 2022 (EP) .................................... 22152340

(51) Int. Cl.

| | |
|---|---|
| ***H01R 4/18*** | (2006.01) |
| ***H01R 4/02*** | (2006.01) |
| ***H01R 43/02*** | (2006.01) |
| ***H01R 43/048*** | (2006.01) |

(52) U.S. Cl.

CPC ............ *H01R 4/187* (2013.01); *H01R 4/023* (2013.01); *H01R 43/0221* (2013.01); *H01R 43/048* (2013.01)

(58) Field of Classification Search

CPC .... H01R 4/187; H01R 4/023; H01R 43/0221; H01R 43/048; H01R 43/28

See application file for complete search history.

(56) References Cited

U.S. PATENT DOCUMENTS

| | | | | | |
|---|---|---|---|---|---|
| 4,164,808 | A * | 8/1979 | Gudmestad .......... | H01R 43/052 414/753.1 |
| 4,489,476 | A * | 12/1984 | Over .................... | H01R 43/052 29/33 M |
| 4,763,411 | A * | 8/1988 | Takeshita ............... | H01R 43/28 29/748 |

(Continued)

FOREIGN PATENT DOCUMENTS

| | | |
|---|---|---|
| DE | 10358153 A1 | 8/2004 |
| DE | 10 2009 056799 A1 | 6/2011 |

(Continued)

OTHER PUBLICATIONS

Translation of JP-2011192465-A (Year: 2001).*

(Continued)

*Primary Examiner* — Jeffrey T Carley

(74) *Attorney, Agent, or Firm* — Husch Blackwell LLP

(57) ABSTRACT

Prior to insertion into the recess of a crimping region, the axial ends of the plurality of electrical strands of the cable are fixed with a clamping tool so that the axial ends of the plurality of electrical strands protrude axially out of the clamping tool and the ends of the plurality of strands protruding axially from the clamping tool are sheared off in the transverse direction with a cutting tool so that a closed end face is produced at the axial end of the strands. The axial end of the plurality of electrical strands is inserted into the recess and the plurality of strands are welded to the contact piece by melting the closed end face arranged in the recess by radiation energy of a radiation directed onto the end face.

11 Claims, 6 Drawing Sheets

(56) References Cited

U.S. PATENT DOCUMENTS

| | | | | | |
|---|---|---|---|---|---|
| 5,168,613 | A * | 12/1992 | Bair | H01R 43/048 29/33 M |
| 6,212,757 | B1 * | 4/2001 | Hasegawa | H01R 43/05 29/33 M |
| 10,122,095 | B2 * | 11/2018 | Kojima | H01R 4/18 |
| 10,254,499 | B1 * | 4/2019 | Cohen | G02B 6/25 |
| 10,431,909 | B2 * | 10/2019 | Vaccaro | H01R 4/029 |
| 11,749,912 | B2 * | 9/2023 | Ito | H01R 4/02 439/874 |
| 2006/0057903 | A1 * | 3/2006 | Asakura | H01R 43/0221 439/874 |
| 2006/0208838 | A1 | 9/2006 | Beuscher et al. | |
| 2017/0229797 | A1 * | 8/2017 | Wurm | H01R 11/28 |
| 2018/0197660 | A1 * | 7/2018 | Nabeta | H01R 43/28 |
| 2019/0356062 | A1 * | 11/2019 | Sato | H01R 4/029 |

FOREIGN PATENT DOCUMENTS

| | | | | |
|---|---|---|---|---|
| DE | 202015008963 | U1 | 4/2016 | |
| DE | 10 2016 125 748 | B3 | 3/2018 | |
| DE | 1020161257486 | B3 | 3/2018 | |
| EP | 3637550 | A1 | 4/2020 | |
| JP | 2011192464 | A | 9/2011 | |
| JP | 2011192465 | A * | 9/2011 | |
| WO | WO-2013175902 | A1 * | 11/2013 | H02G 15/046 |

OTHER PUBLICATIONS

Translation of WO-2013175902-A1 (Year: 2013).*
Examination Report issued on Apr. 22, 2025 in EP Application No. 22 152 340.0.

* cited by examiner

METHOD FOR CONNECTING AN ELECTRICAL CABLE TO A CONTACT PIECE

CROSS-REFERENCE TO RELATED APPLICATION

This application claims priority to European Patent Application No. 22152340.0, the disclosure of which is incorporated herein by reference in its entirety.

FIELD

The present teaching relates to a method for connecting an electrical cable to a plurality of electrical strands with a contact piece, wherein a crimp region having a central recess, which is at least partially surrounded by a crimp tab, is formed on the contact piece, and the axial ends of the plurality of electrical strands are inserted into the recess and are pressed together to produce an electrical connection to the crimp tab.

BACKGROUND

When assembling electrical cables, a contact piece, such as a cable lug or a contact pin, is often attached to one end of the cable, with which an electrical connection can be established between the cable and a cable connection when the cable is used. In order to connect the cable to the contact piece, crimp connections are often used by means of which the electrical cable (or its electrical conductor) is pressed in a crimping section of the contact piece. In order to produce an operationally reliable, permanently fixed and electrically good connection between the contact piece and the cable, the cable and the contact piece can also be welded after crimping, for example by means of laser welding. Such connecting methods are known from DE 103 58 153 A1 or DE 10 2009 056 799 A1.

However, such connection methods are complex in terms of process engineering and associated with difficulties. First, an electrical insulation of the cable must be removed in order to expose the electrical conductors of the cable without damaging the conductors. Then the exposed conductor portion has to be arranged in the crimping section and pressed therein. Attention has to be paid to produce a good electrical connection without damaging the electrical conductors. During welding, welding spatter, oxidation or powder traces can occur, which can also impair the cable. If electrical conductors made of aluminum are used, there is also the problem that, on the surface of aluminum, an electrically insulating oxide layer quickly forms, which can impair electrical conductivity and can also lead to impairments during welding.

It is an object of the present teaching to improve process stability during the creation of a connection between a contact piece and a cable, as well as the quality of such a connection.

BRIEF SUMMARY

This object is achieved by the fact that the axial ends of the plurality of electrical strands are fixed by a clamping tool before being inserted into the recess, so that the axial ends of the plurality of electrical strands protrude axially out of the clamping tool and the ends of the plurality of strands protruding axially from the clamping tool are sheared off in the transverse direction with a cutting tool, so that at the axial end of the strands a closed end face is produced, that the axial end of the plurality of electrical conductors is inserted into the recess, and that the plurality of strands are welded to the contact piece by melting the closed end face arranged in the recess by means of radiation energy of a radiation directed onto the end face.

By shearing-off the strands, a closed end face is produced at the axial end of the cable, which on the one hand facilitates the insertion of the cable into the crimping region and, on the other hand, also improves the end-face welding after the crimping. Both increase the process stability of the connection process and also the quality of the produced connection.

The end-face welding can be improved if the closed end face is arranged axially offset in the recess from an end edge of the crimping region facing away from the cable.

Depending on the application, the ends of the plurality of strands protruding axially from the clamping tool can be sheared off normal to the longitudinal axis of the cable so that the end face is aligned normal to the longitudinal axis of the cable, or is sheared off at an angle to the longitudinal axis of the cable, so that the end face is aligned at an angle to the longitudinal axis of the cable.

An oblique end face has certain advantages. On the one hand, radiation, such as a laser beam, which is to impinge substantially normal to the end face, is aligned in a direction deviating from the longitudinal axis of the cable. This can increase safety during welding because radiation cannot escape from a lock of a welding chamber in which the cable is inserted in the longitudinal direction of the cable. Contact pieces can thus also be welded in which the radiation cannot be directed in the longitudinal direction of the cable through a functional part of the contact piece. Not least, an oblique end face also improves the tensile strength and also the electrical conductivity of the connection.

In order to prevent shadowing of the radiation at the end face arranged in the recess, it can be provided that a recess in the crimp tab is provided in the region of the end edge.

Shadowing can also be prevented if the end edge is beveled at an angle to the longitudinal axis of the cable and the end face is beveled at a steeper angle than the angle of the end edge. In this case, a region of the end face is arranged closer to the end edge than is the rest of the end face. A larger region of the end face is thus accessible for the radiation.

The axial end of the strands is advantageously pressed in the radial direction, preferably pressed in a gas-tight manner, before shearing. The resulting region, compressed by the pressing, with fewer cavities between the strands, can on the one hand improve the electrical conductivity. On the other hand, the welding can also be improved because the radiation energy of the radiation can penetrate better into the axial end.

A coating, for example a nickel layer, is often present on the surface of the contact piece. Such a coating on the surface of the contact piece can be removed at least in regions in the crimping region before the crimping in order to improve the electrical connection. Such a coating on the surface of the contact piece can also be removed at least in regions in the welding region and/or in the region in front of the end face in the recess before the welding in order to improve the welding quality. In a particularly advantageous embodiment, the coating is removed with the radiation which is also used for welding.

BRIEF DESCRIPTION OF DRAWINGS

The present teaching is described below in greater detail with reference to FIGS. 1a to 8, which show schematic and non-limiting advantageous embodiments by way of example. The drawings show.

DETAILED DESCRIPTION

Figure 1A:
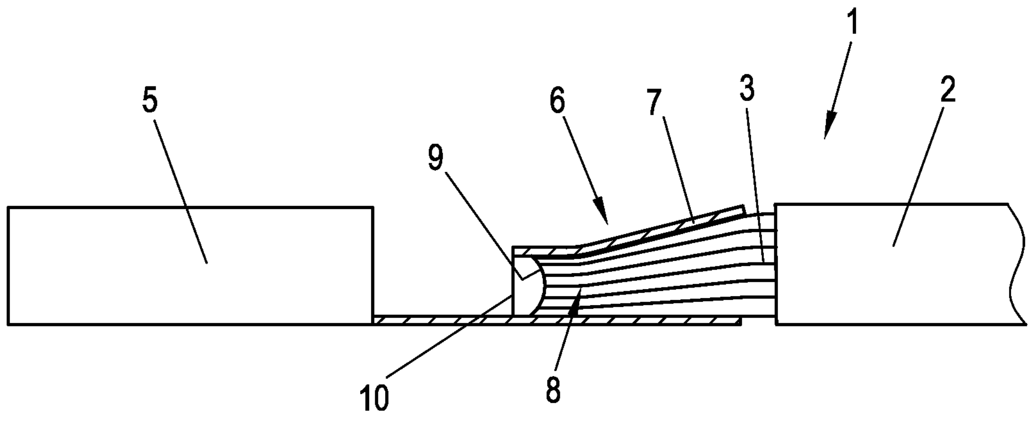
FIGS. 1a and 1b an electrical conductor having a contact piece and a cable connected thereto, FIGS. 2a to 2f a method for producing the connection between the contact piece and the cable, FIGS. 3a and 3b the shearing of the axial ends of the strands of the cable with an end face normal to the longitudinal axis of the cable, FIGS. 4a and 4b the shearing of the axial ends of the strands of the cable with an end face at an angle to the longitudinal axis of the cable, FIG. 5 an embodiment of a welding chamber for welding the crimped cable to the contact piece, FIGS. 6a and 6b an electrical conductor having a contact piece and a cable connected thereto with an oblique end face, FIGS. 7a and 7b an electrical conductor having a contact piece and a cable connected thereto having an oblique end face and a recess for the laser beam in the region of the end edge and FIG. 8 an embodiment of a welding chamber for a cable having an oblique end face.
Figure 1B:
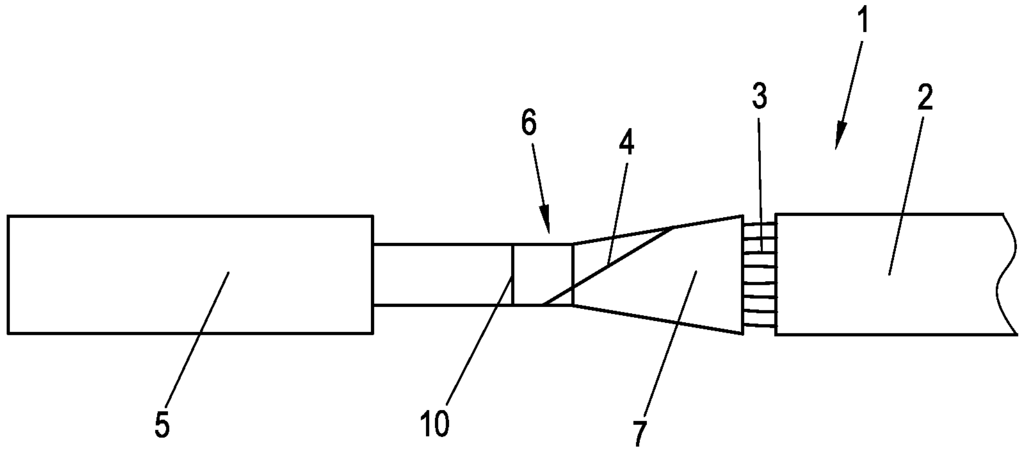

FIGS. 1a and 1b show a fully assembled electrical conductor according to the present teaching. An electrical cable 1 with an external electrical insulation 2 has been stripped at an axial end by removing the outer insulation, so that the electrical strands 3 of the cable 1 are exposed. The exposed strands 3 have been inserted into a crimping region 6 of a contact piece 5. The crimping region 6 is shown in section in FIG. 1a in order to show the strands 3. The crimping region 6 is formed by a crimp tab 7 which at least partially surrounds a recess 8, wherein the electrical strands 3 are arranged in the recess 8. The strands 3 in the recess 8 are pressed with the crimp tab 7 in a known manner using a crimping tool. After the pressing, the strands 3 and the contact piece 5 are welded together in the region of the crimp tab 7. The welding takes place on the end face 9 of the strands 3 arranged in the recess 8. For this purpose, the end face 9 of the strands 3 is preferably arranged set back axially from the end edge 10 of the crimping region 6 facing away from the cable 1. The welding is carried out by means of radiation energy, preferably with a laser beam, which is directed onto the end face 9 in order to melt the strands 3 in the region of the end face 9. Due to the adhesive forces, the melted and also the finished end face 9 of the strands can form a concave surface, as shown in FIG. 1a.

In FIGS. 1a and 1b, the cable 1 is provided with an outer insulation 2, which must first be removed to expose the strands 3 in order to make an electrical connection between the strands 3 of the cable 1 and the contact piece 5 in the region of the axial end of the cable 1. Of course, a cable 1 without insulation 2 can also be used, whereby the step of stripping can also be omitted. Likewise, the cable can already have been stripped at the axial end, so that the step of stripping can also be omitted in this case.

FIGS. 2a to 2f explain the method for producing the electrical connection between the electrically conductive strands 3 of a cable 1 and a contact piece 5.

Figure 2A:
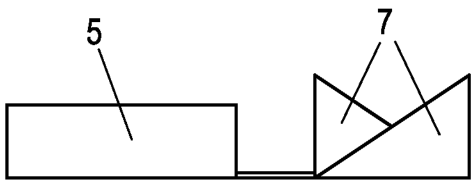

At one axial end, the contact piece 5 has a crimp tab 7 which in FIG. 2a has already been bent upward. At the other axial end, a functional part of the contact piece 5, such as a contact plug, a contact pin, etc., is formed. With a molding tool 11 and a mandrel 12, the crimping region 6 is formed by the crimp tab 7 being reshaped in the desired manner around the mandrel 12. In the embodiment shown, the crimping region 6 has a recess 8 with a conically converging inlet region which merges into a cylindrical pressing region. The strands 3 of the cable 1 are inserted into the recess 8 via the inlet region, whereby the cone facilitates insertion. The end face 9 of the strands 3 is arranged in the pressing region of the crimping region 6. The recess 8 can, of course, also have any other suitable shape and geometry.

After reshaping on the peripheral surface, the crimp tab 7 usually abuts one another at a crimp tab scarf interface 4 (FIG. 1b). The crimp tab 7 can also be shaped such that it forms a crimp lock on the outer circumferential surface on the crimp tab scarf interface 4, which can bring about better cohesion of the crimp tab 7.

Figure 2B:
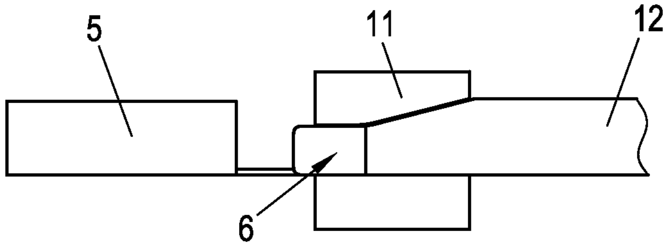

The step of forming the crimping region 6, as described for example with reference to FIGS. 2a and 2b, can, of course, also be omitted if a contact piece 5 with an already finished crimping region 6 is used. The steps according to FIGS. 2a and 2b are therefore to be considered as optional.

Figure 2C:
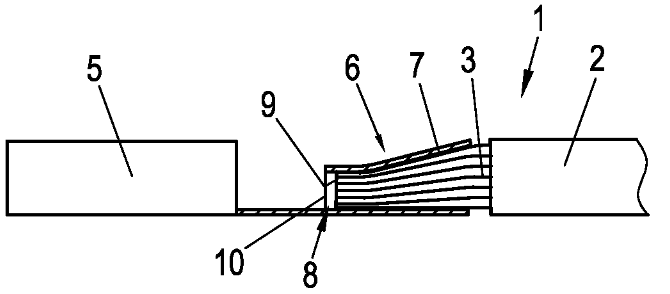

In FIG. 2c, the axial end of the strands 3 has been inserted into the recess 8 of the crimping region 6 so that the end face 9 of the strands 3 is arranged axially offset from the end edge 10 of the crimping region 6 facing away from the cable 1 in the recess 8.

Figure 2D:
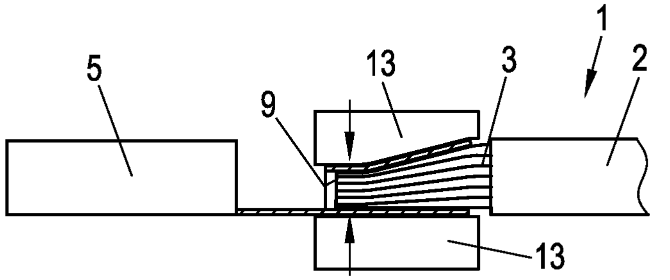

In step FIG. 2d, the strands 3 in the recess 8 of the crimping region 6 are pressed with the crimp tabs 7 by means of a crimping tool 13 in a known manner (indicated by arrows). Preferably, the recess is 0.2-0.5 mm larger than the finished compressed size. As a result, crimping defects can be avoided and also the risk of crushing for the strands 3 (crushing individual strands 3 between the crimp tabs) can be reduced. A risk of crushing can also be reduced by providing a crimp tab scarf interface 4 that is inclined relative to the longitudinal axis of the cable 1, as shown in FIG. 1b.

Figure 2E:
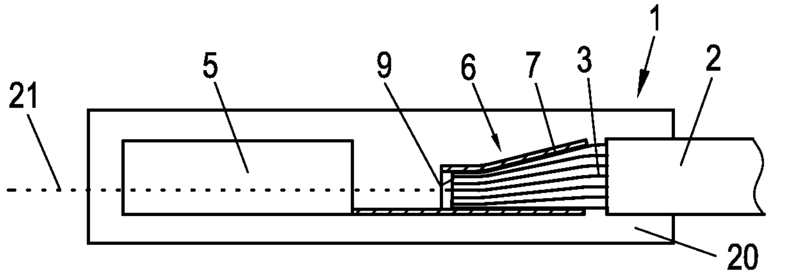

The cable 1 is then brought with the crimped contact piece 5 into a welding chamber 20, in which the strands 3 are welded to the crimp tab 7 (FIG. 2e). For this purpose, a radiation, preferably an electromagnetic radiation, such as a laser beam 21, is directed onto the end face 9, preferably substantially normal to the end face 9, in order to heat and melt the strands 3 in the region of the end face 9 by the radiation energy. The crimp tab 7 is preferably not actively heated by the radiation.

The heating of the end face 9 by the radiation is preferably carried out in such a way that first the edge region of the pressed strands 3 and then the inner region of the pressed strands 3 is heated.

Figure 2F:
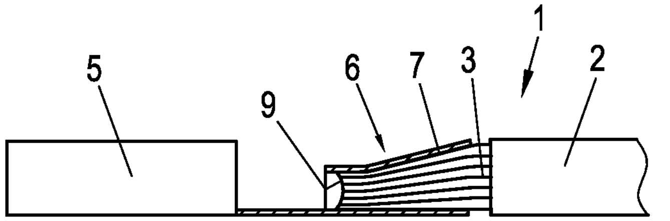

FIG. 2f shows the finished welded conductor consisting of the cable 1 and the contact piece 5. FIG. 2f also shows a concave surface of the finished end face 9 formed by the adhesive forces of the melted end face 9 of the strands.

Figure 3A:
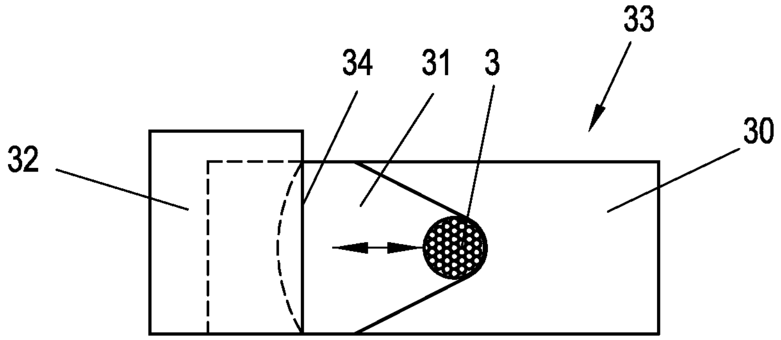
Figure 3B:
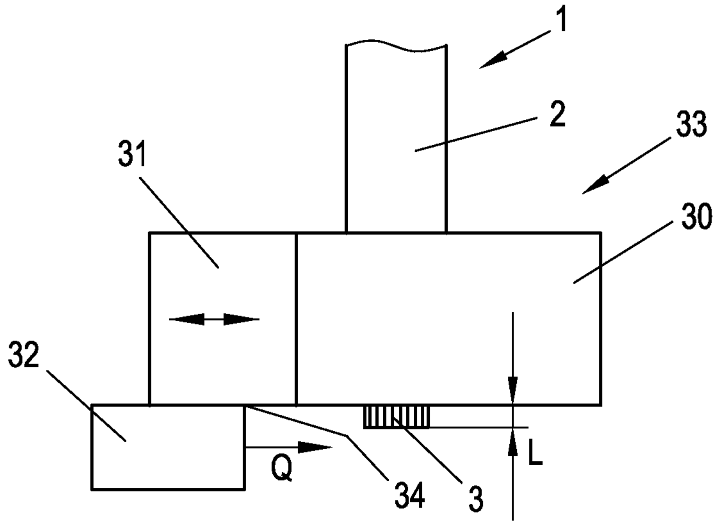

Before inserting the strands 3 into the recess 8 of the crimping region 6, the axial end of the strands 3 is pretreated according to the present teaching, as described with reference to FIGS. 3a and 3b.

The axial end of the strands 3 is fixed in a clamping tool 33, for example in the form of two clamping jaws 30, 31 which are movable relative to one another, wherein the axial end of the strands 3 protrudes freely from the clamping tool 33 by a certain axial length L. The axial end of the strands 3 protruding from the clamping tool 33 is sheared off with a cutting tool 32 in the transverse direction Q (transversely to the longitudinal direction of the strands 3). As a result of shearing-off in the transverse direction Q, not only a clean end face 9 is created, but also a closed cut surface results at the interface by the deformation during shearing, since the ends of the strands 3 are compressed or even cold-welded. The finished cut surface forms the end face 9 of the strands 3. The cutting edge 34 of the cutting tool 32 is preferably at an obtuse angle because this assists the production of the closed end face 9. The cutting edge 32 can also be designed to be concave or convex, if necessary, as indicated by dashed lines in FIG. 3*a*.

The strands 3 can not only be fixed by the clamping tool 33, but the axial end of the strands 3 can also be pressed in a radial direction, preferably pressed in a gas-tight manner. During pressing, the strands 3 are compressed in the radial direction, for example by the clamping jaws 31, 32, in order to reduce cavities between the individual strands 3 in the pressing region. In the case of gas-tight pressing, cavities in the pressing region are eliminated. Such pressing can improve electrical conductivity at the transition between the strands 3 and the contact piece 5. For pressing, a corresponding radial pressure is exerted on the strands 3.

However, such a pressing can also be a separate process step. In this case, the axial end is pressed with a clamping tool before shearing-off in a separate device.

The clamping jaws 31, 32 advantageously have a non-circular, such as an elliptical or oval, inner shape for the pressing. Gas-tight pressing above all can be realized more easily in a non-circular form.

In addition, the axial end of the strands 3 can also be shaped in the axial direction during pressing, preferably according to the shape of the crimping region 6. Advantageously, during pressing at the axial end, a cylindrical region is formed which merges into a conical region and can then optionally also transition into a rounded inlet region. Such a shape in the axial direction can advantageously be used in a crimping region 6 as shown in FIG. 1*a*. If the axial end of the strands 3 is formed analogously or diametrically opposed to the crimping region 6, less forming work has to be applied during crimping due to the preforming. In the case of a gas-tight pressing, the strands 3 are pressed in a gas-tight manner in the region of the cylindrical region, that is to say at the axial end of the strands 3.

Figure 4A:
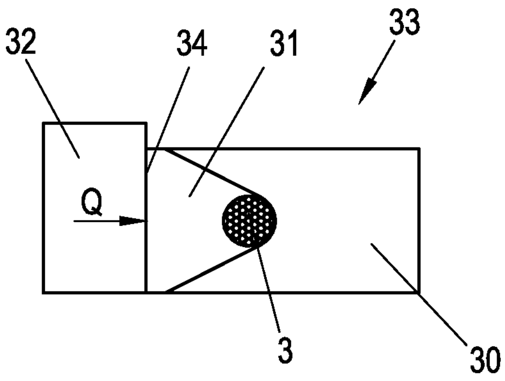
Figure 4B:
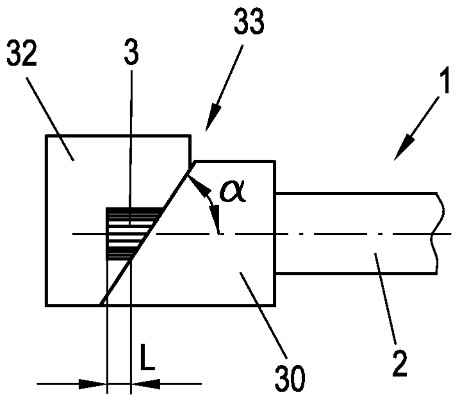

However, the end of the strands 3 does not necessarily have to be sheared off at right angles to the longitudinal axis of the strands 3 or of the cable 1, but instead the end face 9 can also be formed at a certain angle α to the longitudinal axis, as shown in FIGS. 4*a* and 4*b*.

The closed end face 9 produced by shearing has advantages in particular during the end-face welding of the strands 3 with the crimp tab 7. On the one hand, the axial end of the strands 3 can thereby be inserted into the recess 8 more easily and more reliably because no individual strands 3 are able to bend. On the other hand, the end face 9 can thus be better heated with the radiation, preferably the laser beam 21. Both lead to a higher process stability. If the axial end of the strands 3 is additionally compressed, the end face region for welding can be heated even better.

However, shearing-off can also easily be incorporated into the overall process of manufacturing the electrical connection. The shearing-off requires only a short time and can be carried out shortly before the welding. This is particularly advantageous when the strands 3 are made of a material, such as aluminum, that rapidly oxidizes in the ambient atmosphere, such as in ambient air. The shearing results in a bare, oxide-free surface, which improves the welding, but also increases the quality of the electrical connection produced.

Figure 5:
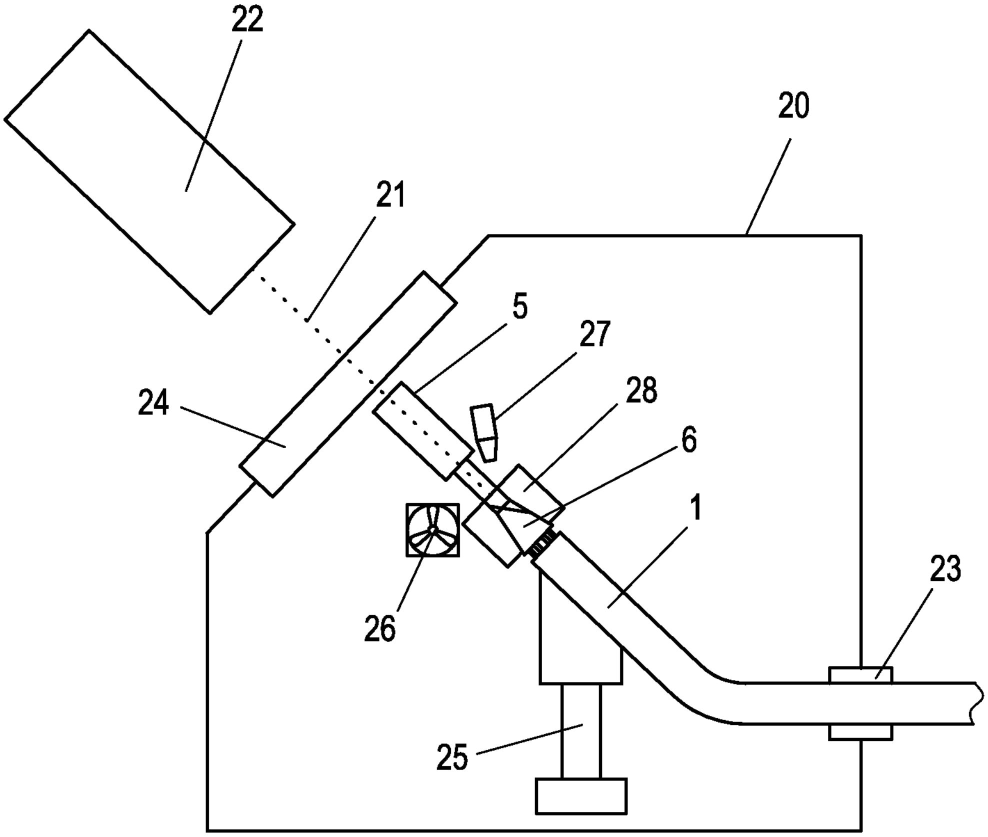

FIG. 5 shows a possible embodiment of a welding chamber 20 for welding the strands 3 to the contact piece 5 by means of a laser 22, wherein any other suitable radiation source for generating a radiation could also be used. The cable 1 with the crimped contact piece 5 is inserted into the welding chamber 20 via a lock 23. The lock 23 can be closed around the cable 1 in order to prevent unintentional escape of the laser beam 21 from the welding chamber 20. The cable 1 can also be angled in the welding chamber 20 at an angle to the longitudinal axis of the cable 1 so that the direction of the laser beam 21 deviates from the longitudinal axis. For this purpose, a suitable device 25 can be provided in the welding chamber 20 in order to angle the cable 1, for example by lifting the cable end. This can also help prevent unintentional escape of laser beam 21 from the welding chamber 20 through the lock 23. This is particularly advantageous when the end face 9 of the strands 3 is oriented substantially normal to the longitudinal axis of the cable 1 and the laser beam 21 is to impinge substantially normal to the end face 9 during welding.

A holding device 28 can also be provided in the welding chamber 20 to hold the contact element 5, preferably in the region of the crimping region 6, at least during welding.

The laser beam 21 can be generated by a laser 22 and coupled into the welding chamber 20 via a window 24. However, the laser 22 can also be arranged in the welding chamber 20.

The laser 22 comprises, if required, known devices to guide the laser beam 21 to different points of a certain region, for example the end face 9.

A shielding-gas nozzle 27 can also be provided in the welding chamber 20 to supply shielding gas to the welding point during welding. The quality of the welded joint can thus be increased.

An extraction port 26 can also be provided in the welding chamber 20, preferably in the vicinity of the welding point, to extract welding vapors and possibly shielding gas. This can improve the welding quality.

An air flow can be generated by means of an extraction device 26 and/or a supply of shielding gas to the welding point, which can reduce disadvantageous welding effects, such as oxidation, welding spatter, powder traces, etc.

Figure 6A:
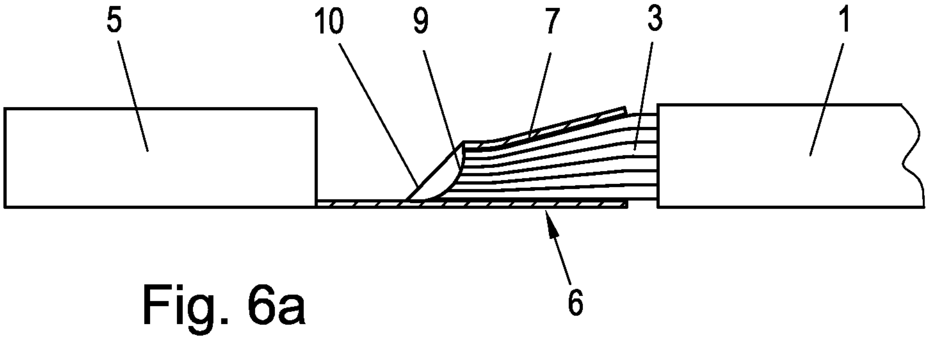
Figure 6B:
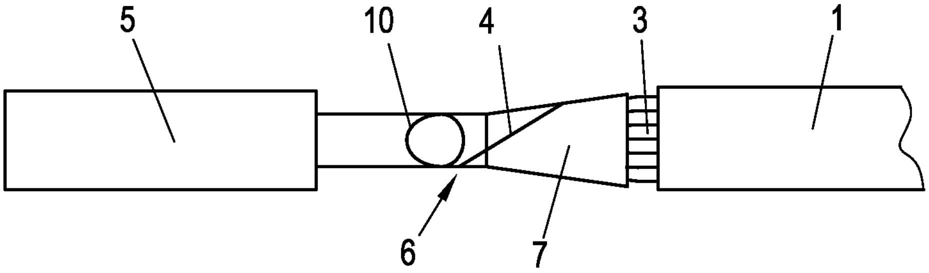

FIGS. 6*a* and 6*b* show an embodiment in which the end face 9 is not oriented normal to the longitudinal axis of the cable 1, but at an angle deviating from 90°. In order to facilitate the welding, the end edge 10 of the crimping region 6 can also be inclined at a similar or the same angle.

The advantage of an inclined end face 9 of this kind is that the radiation, for example the laser beam 21, which is to impinge substantially normal to the end face 9, is by default oriented in a direction deviating from the longitudinal axis of the cable 1. In this way radiation can be prevented from escaping through the lock 23 of the welding chamber 20 without the cable 1 having to be bent in the welding chamber 20, as can be seen in FIG. 7.

Furthermore, an oblique end face 9 enables the processing of contact pieces 5 whose functional part does not provide a passage for the radiation, for example the laser beam 21, such as for example in the case of a full contact pin.

An oblique end face 9 also improves the tensile strength and the electrical conductivity of the connection.

Figure 7A:
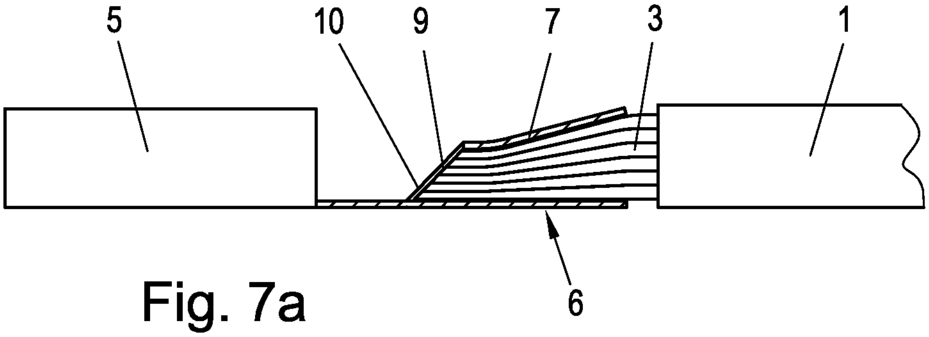
Figure 7B:
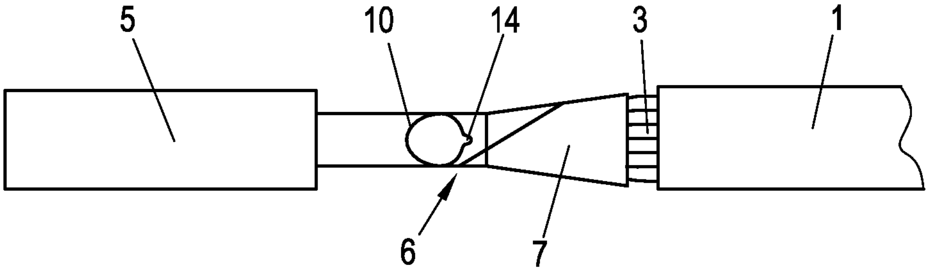

However, due to the oblique end edge 10, it can happen that the radiation, such as the laser beam 21, does not reach a certain region of the end face 9 in the recess 8 of the crimping region 6 because said region is shadowed by the end edge 10. In order to prevent this, a recess 14 can be provided in the crimp tab 7 in the region of the end edge 10, through which recess the radiation can also reach previously shadowed regions of the end face 9. This is shown in FIGS. 7*a* and 7*b*.

Such a recess 14 can be produced after crimping by machining, such as milling or grinding, or can already have been prefabricated on the crimp tabs 7, for example when punching the contact piece 5 out of a sheet metal. It is also possible to burn away with the radiation, such as laser beam 21, the part of crimp tab 7 that is disruptive during welding. For this purpose, radiation could be generated, for example, with different power levels. In a further alternative, the angles of the end edge 10 and the end face 9 could be selected differently. In the area of radiation shadowing, the end face 9 could be arranged less far from the end edge 10 and the end face 9 could be arranged at a steeper angle to the end edge 10.

Figure 8:
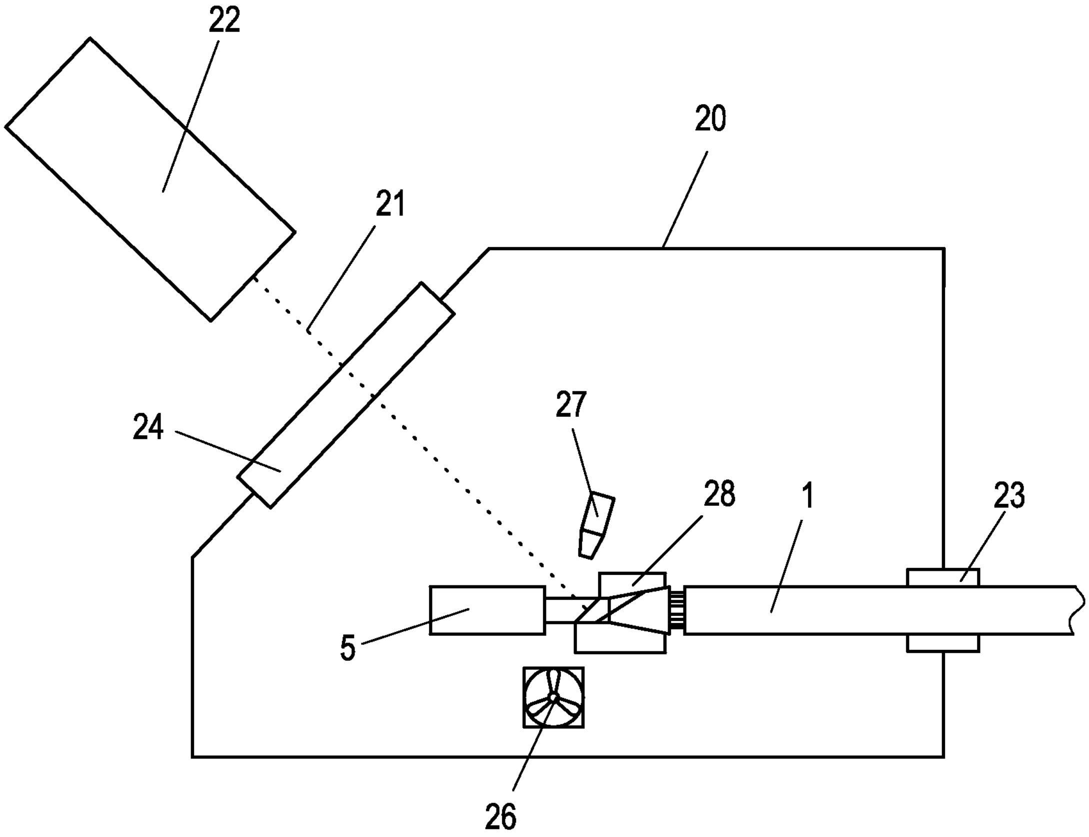

FIG. 8 shows a welding chamber 20 with laser 22 as a radiation source, for example, in which a cable 1 with an oblique end face 9 is welded at the end face to a contact piece. The laser beam 21, which is to impinge substantially normal to the end face, points in a direction other than the longitudinal axis of the cable 1 and cannot therefore escape from the lock 23. Furthermore, in such an embodiment, a device 25 for bending the cable 1 is not required either.

The contact pieces 5 are often punched out of a strip material and bent into the desired shape. The strip material frequently receives a protective coating on the surface, such as a nickel layer. Such a nickel layer can impair not only the electrical conductivity but also the weld quality. For this reason, it is advantageous to remove a coating, if present, before the crimping, at least at locations of the contact piece 5 where an electrical connection is created or where welding is performed. The (partial) removal of the coating can be carried out mechanically, thermally or chemically. For mechanical removal of the coating, for example, the inner surface of the crimp tab 7 can be machined with an abrasive brush. For chemical removal, etching pins or spray nozzles can be used. Thermal removal can be effected by vaporization in the intended region by means of radiation, such as by means of a laser, for example. In an advantageous embodiment, after the crimping and before the welding directly in front of the end face 9 in the recess 8, the coating is removed on the inside of the crimp tab 7 in the welding station 20 by means of the laser beam 21.

The strands 3 and the contact piece 5 can also be first crimped within the welding chamber 20. In such a configuration, the radiation, such as the laser beam 21, can also be used to remove a coating of the contact part at least in regions in the crimping region.

The invention claimed is:

1. A method for connecting an electrical cable including a plurality of electrically conductive strands to a contact piece, comprising:

forming a crimping region including a central recess surrounded at least in part by a crimp tab on the contact piece;

fixing axial ends of the plurality of electrical strands using a clamping tool before the axial ends are inserted into the recess so that the axial ends of the plurality of electrical strands protrude axially out of the clamping tool and shearing off the ends of the plurality of strands protruding axially from the clamping tool in a transverse direction using a cutting tool, to produce a closed end face at the axial end of the plurality of electrical strands, the closed end face being transverse to an axial direction of the plurality of electrical strands;

inserting the axial ends of the plurality of electrical strands into the recess;

pressing the axial ends of the plurality of electrical strands together with the crimp tab to produce an electrical connection; and welding the plurality of strands to the contact piece by melting the closed end face arranged in the recess by radiation energy of a radiation source directed substantially normal onto the end face, wherein the radiation source is directed substantially normal to the end face, and wherein, due to adhesive forces, the melted closed end face forms a concave surface.

2. The method according to claim 1, wherein the closed end face is arranged axially offset in the recess from an end edge of the crimping region that faces away from the cable.

3. The method according to claim 1, wherein the ends of the plurality of strands protruding axially from the clamping tool are sheared off normal to a longitudinal axis of the cable so that the end face is oriented normal to the longitudinal axis of the cable.

4. The method according to claim 1, wherein the ends of the plurality of strands protruding axially from the clamping tool are sheared off at an angle to a longitudinal axis of the cable so that the end face is oriented at an angle to the longitudinal axis of the cable.

5. The method according to claim 4, wherein a recess is provided in the crimp tab in a region of an end edge of the crimping region to prevent shadowing of the radiation energy at the end face arranged in the recess.

6. The method according to claim 4, wherein:

an end edge of the crimping region is chamfered at an angle to the longitudinal axis of the cable; and the end face is chamfered at an angle steeper than the angle of the end edge.

7. The method according to claim 1, wherein the axial end of the strands is pressed in a radial direction before shearing-off.

8. The method according to claim 1, wherein a coating on a surface of the contact piece is removed from an area in the crimping region before the crimping.

9. The method according to claim 1, wherein a coating on at least one of a surface of the contact piece in the welding region or in a region in front of the end face in the recess is at least partially removed before the welding.

10. The method according to claim 9, wherein the coating is removed by the radiation energy.

11. The method according to claim 7, wherein the axial end of the strands is pressed to be gas-tight.

* * * * *